(12) United States Patent
Liang et al.

(10) Patent No.: US 10,250,870 B2
(45) Date of Patent: Apr. 2, 2019

(54) ADJUSTABLE VIRTUAL REALITY DEVICE CAPABLE OF ADJUSTING DISPLAY MODULES

(71) Applicant: Wistron Corporation, New Taipei (TW)

(72) Inventors: Chen-Yi Liang, New Taipei (TW); Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 129 days.

(21) Appl. No.: 15/437,453

(22) Filed: Feb. 21, 2017

(65) Prior Publication Data

US 2018/0091805 A1 Mar. 29, 2018

(30) Foreign Application Priority Data

Sep. 26, 2016 (TW) .............................. 105130948 A

(51) Int. Cl.
*H04N 13/128* (2018.01)
*H04N 13/398* (2018.01)
*H04N 13/383* (2018.01)
*H04N 13/344* (2018.01)
*G02B 27/22* (2018.01)

(52) U.S. Cl.
CPC ....... *H04N 13/398* (2018.05); *G02B 27/2221* (2013.01); *H04N 13/128* (2018.05); *H04N 13/344* (2018.05); *H04N 13/383* (2018.05)

(58) Field of Classification Search
None
See application file for complete search history.

(56) References Cited

U.S. PATENT DOCUMENTS

| 2002/0159028 | A1 | 10/2002 | Masaki | |
|---|---|---|---|---|
| 2007/0171524 | A1 | 7/2007 | Steinthal | |
| 2013/0169683 | A1* | 7/2013 | Perez | G02B 27/02 345/633 |
| 2014/0362446 | A1* | 12/2014 | Bickerstaff | G02B 27/017 359/630 |
| 2014/0375542 | A1 | 12/2014 | Robbins | |

FOREIGN PATENT DOCUMENTS

| CN | 102955349 A | 3/2013 |
|---|---|---|
| CN | 105393159 A | 3/2016 |
| TW | M399934 U1 | 3/2011 |
| TW | 201413368 A | 4/2014 |
| TW | M504249 U | 7/2015 |
| TW | M509357 U | 9/2015 |

\* cited by examiner

*Primary Examiner* — Eileen M Adams
(74) *Attorney, Agent, or Firm* — Winston Hsu

(57) ABSTRACT

An adjustable virtual reality device includes a first display module, a first image capturing unit, a second display module, a second image capturing unit, a lateral driving module, and a control unit. The first display module and the second display module display a first image and a second image, respectively. The first image capturing unit and the second image capturing unit detect two positions of two pupils of two eyeballs, respectively. The control unit calculates a pupil distance between the two pupils according to the two positions of the two pupils and controls the lateral driving module to drive the first display module and the second display module to move in a lateral direction, so that a lateral distance between the first display module and the second display module is corresponding to the pupil distance, which enhances comfort in use.

22 Claims, 8 Drawing Sheets

ADJUSTABLE VIRTUAL REALITY DEVICE CAPABLE OF ADJUSTING DISPLAY MODULES

BACKGROUND OF THE INVENTION

1. Field of the Invention

The present invention relates to a virtual reality device, and more particularly, to an adjustable virtual reality device capable of adjusting display modules.

2. Description of the Prior Art

A virtual reality device utilizes two displays for providing images for two eyes of a user to create a three-dimensional effect by binocular disparity. However, positions of two displays of a conventional virtual reality device cannot be adjusted according to a pupil distance of a user's two eyes. Therefore, it may cause dizziness and discomfort easily. There is another conventional virtual reality device capable of adjusting a distance between two displays thereof manually for decreasing discomfort. However, since the distance between the two displays are adjusted by users based on their visual feelings, the distance between the two displays cannot be corresponding to a pupil distance of the user's two eyes precisely, which still causes discomfort after wearing the conventional virtual reality device in a moment. Furthermore, distances between two displays and two eyeballs or two lenses of glasses are not adjustable. When the user wears the conventional virtual reality device, two displays may interfere with eyeballs or lenses easily, which also causes wearing discomfort. Furthermore, it is not possible to be customized for a user with high binocular disparity.

SUMMARY OF THE INVENTION

Therefore, an objective of the present invention is to provide an adjustable virtual reality device capable of adjusting display modules for solving the aforementioned problems.

In order to achieve the aforementioned objective, the present invention discloses an adjustable virtual reality device capable of adjusting display modules. The adjustable virtual reality device includes a housing, a base, a first display module, a first detecting assembly, a second display module, a second detecting assembly, at least one transverse driving module, and a control unit. The base is disposed inside the housing. The first display module is movably disposed on the base and for displaying a first image. The first detecting assembly includes a first image capturing unit for detecting a first position of a first pupil of a first eyeball. The second display module is movably disposed on the base and for displaying a second image. The second detecting assembly includes a second image capturing unit for detecting a second position of a second pupil of a second eyeball. The at least one transverse driving module is for driving the first display module and the second display module to move individually or synchronously along a transverse direction. The control unit is electrically connected to the at least one transverse driving module, the first image capturing unit, and the second image capturing unit. The control unit controls the at least one transverse driving module to drive the first display module and the second display module to move individually or synchronously along the transverse direction according to a relation between the first pupil and the second pupil based on the first position of the first pupil detected by the first image capturing unit and the second position of the second pupil detected by the second image capturing unit.

In order to achieve the aforementioned objective, the present invention further discloses an adjustable virtual reality device capable of adjusting display modules. The adjustable virtual reality device includes a housing, a base, a first display module, a first detecting assembly, a second display module, a second detecting assembly, a longitudinal driving module, and a control unit. The base is disposed inside the housing. The first display module is movably disposed on the base and for displaying a first image. The first detecting assembly includes a first distance detecting unit for detecting a first distance between the first display module and a first eyeball or a first lens of glasses corresponding to a first eyeball. The second display module is movably disposed on the base and for displaying a second image. The second detecting assembly includes a second distance detecting unit for detecting a second distance between a second display module and a second eyeball or a second lens of the glasses corresponding to a second eyeball. The longitudinal driving module is for driving the first display module and the second display module to move along a longitudinal direction. The control unit is electrically connected to the longitudinal driving module, the first distance detecting unit, and the second distance detecting unit. The control unit controls the longitudinal driving module to drive the first display module and the second display module to move along the longitudinal direction according to a reference distance generated by the first distance and the second distance.

In summary, the adjustable virtual reality device of the present invention utilizes the first image capturing unit and the second image capturing unit for detecting the two positions of the first pupil of the first eyeball and the second pupil of the second eyeball, and controls the transverse driving module to drive the first display module and the second display module to move along the transverse direction according to the pupil distance between the first pupil and the second pupil or the two positions of the first pupil and the second pupil, which allows the transverse distance between the first display module and the second display module to be corresponding to the pupil distance or allows the two positions of the first display module and the second display module to be corresponding to the two positions of the first pupil and the second pupil. Therefore, it enhances comfort in use. Besides, the adjustable virtual reality device of the present invention further utilizes the first distance detecting unit and the second distance detecting unit for detecting the first distance between the first display module and the first eyeball or the first lens of the glasses corresponding to the first eyeball and the second distance between the second display module and the second eyeball or the second lens of the glasses corresponding to the second eyeball, and controls the longitudinal driving module to drive the first display module and the second display module to move along the longitudinal direction according to the first distance and the second distance, which prevents the first display module and the second display module from interfering with the first eyeball and the second eyeball or the first lens and the second lens of the glasses. It also enhances comfort in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
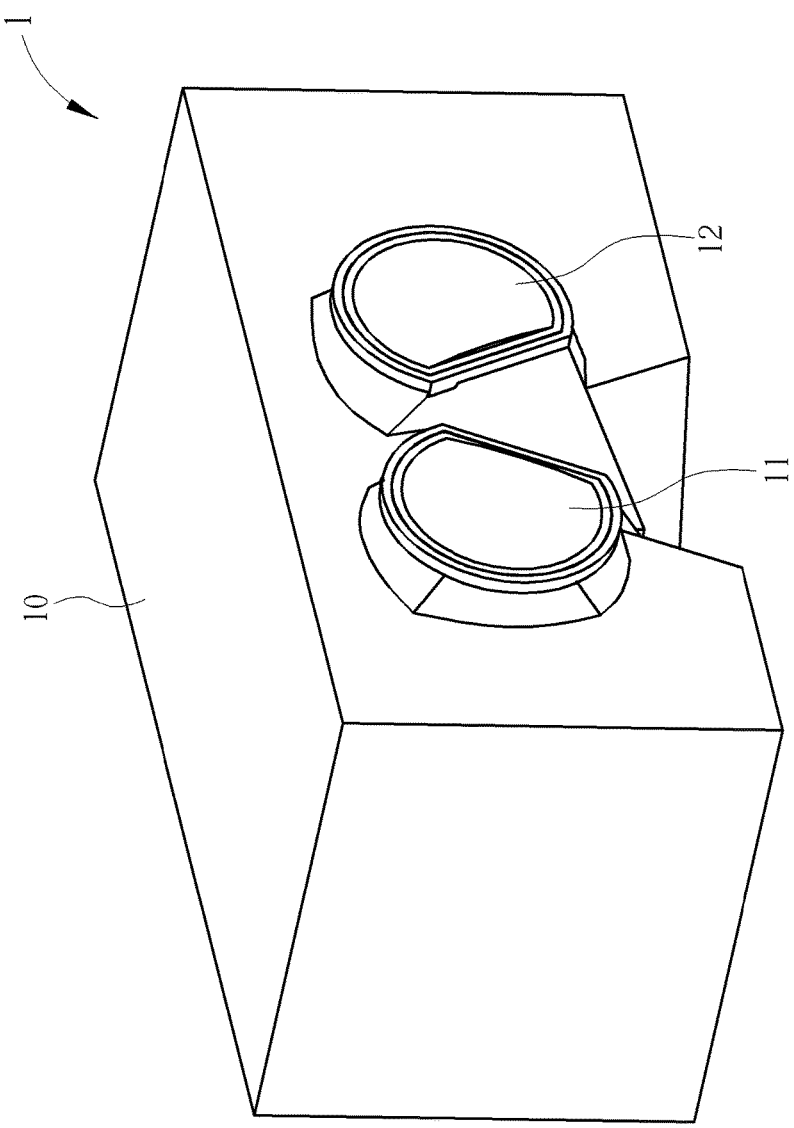
FIG. 1 is a schematic diagram of an adjustable virtual reality device according to a first embodiment of the present invention.
Figure 2:
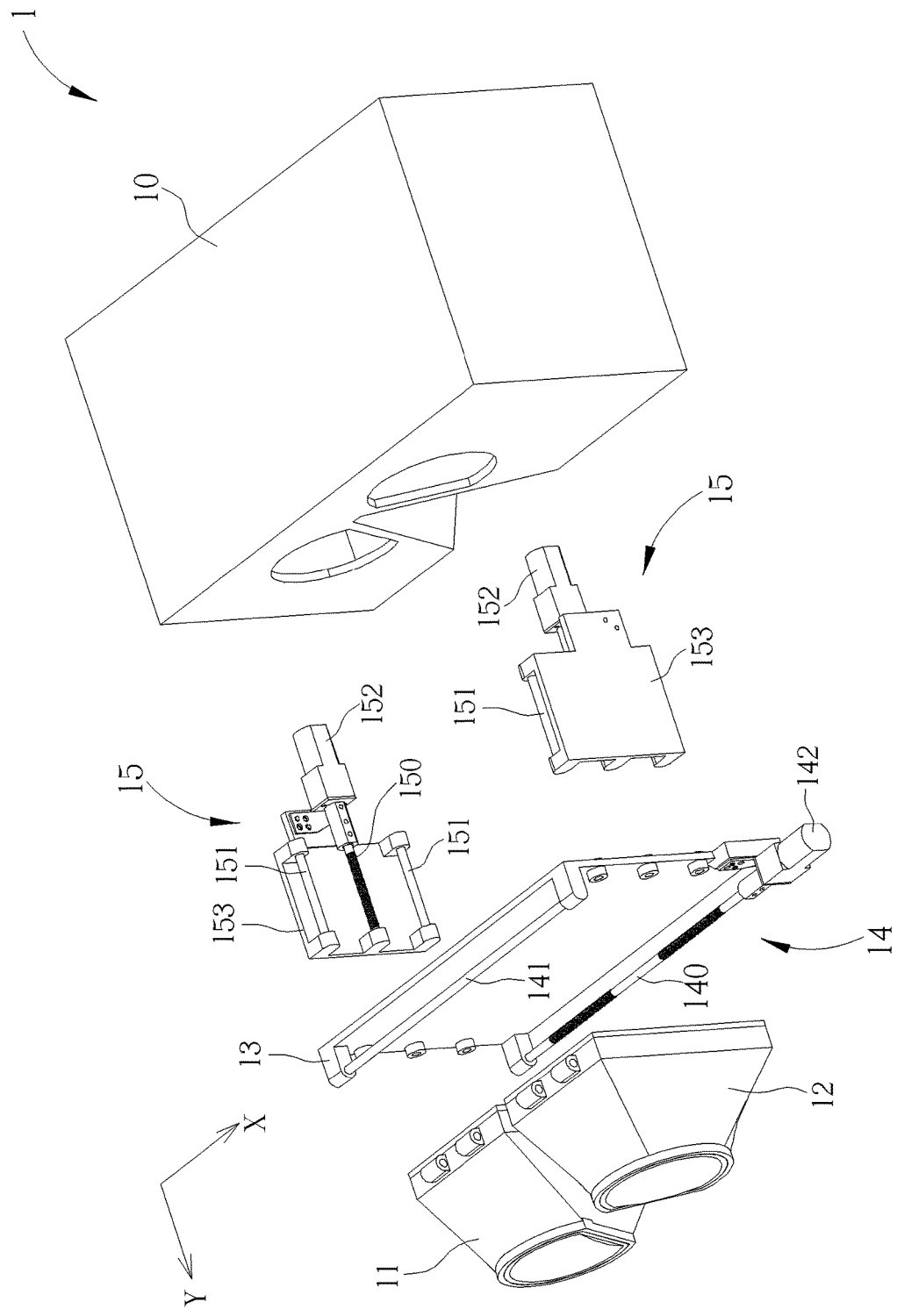
FIG. 2 is an exploded diagram of the adjustable virtual reality device according to the first embodiment of the present invention.
Figure 3:
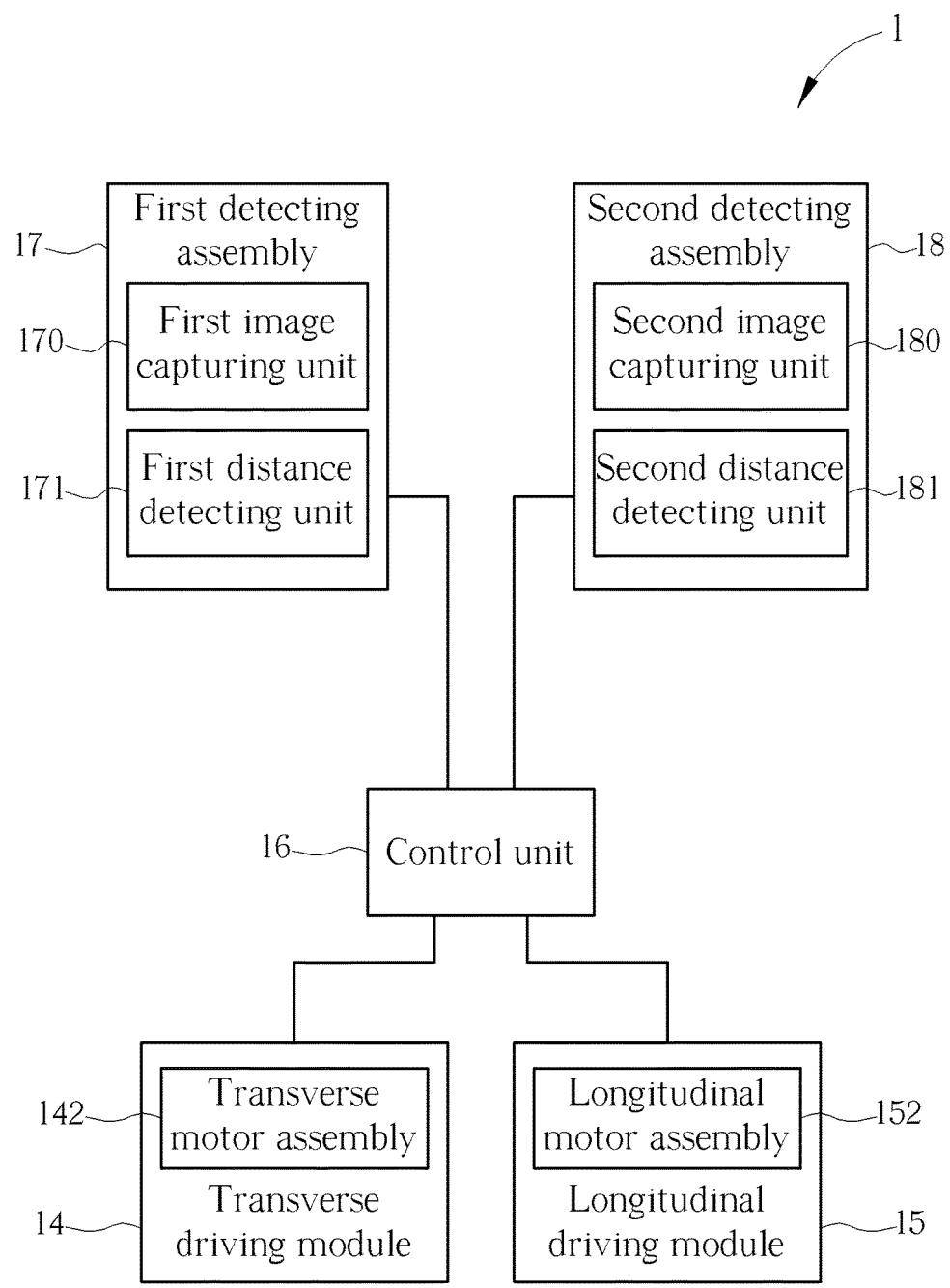
FIG. 3 is a functional block diagram of the adjustable virtual reality device according to the first embodiment of the present invention.

Please refer to FIG. 1 to FIG. 3. FIG. 1 is a schematic diagram of an adjustable virtual reality device 1 according to a first embodiment of the present invention. FIG. 2 is an exploded diagram of the adjustable virtual reality device 1 according to the first embodiment of the present invention. FIG. 3 is a functional block diagram of the adjustable virtual reality device 1 according to the first embodiment of the present invention. As shown in FIG. 1 to FIG. 3, the adjustable virtual reality device 1 includes a housing 10, a first display module 11, a second display module 12, a base 13, a transverse driving module 14, two longitudinal driving modules 15, and a control unit 16. The base 13 is disposed inside the housing 10. The first display module 11 is movably disposed on the base 13 and for displaying a first image. The second display module 12 is movably disposed on the base 13 and for displaying a second image. The transverse driving module 14 is installed on the base 13 and electrically connected to the control unit 16 for driving the first display module 11 and the second display module 12 to move along a transverse direction X. The two longitudinal driving modules 15 are connected to the base 13 and electrically connected to the control unit 16 for driving the first display module 11 and the second display module 12 along a longitudinal direction Y substantially perpendicular to the transverse direction X. However, the numbers of the transverse driving module 14 and the longitudinal driving module 15 are not limited to this embodiment. It depends on practical demands. For example, the adjustable virtual reality device 1 also can include one longitudinal driving module 15 and two transverse driving modules 14. The longitudinal driving module 15 can be located at a side of the base 13. The two transverse driving modules 14 can be installed on the base 13 and coupled to the first display module 11 and the second display module 12 for adjusting the first display module 11 and the second display module 12 to positions corresponding to positions of two pupils of two eyeballs, respectively.

The transverse driving module 14 includes a transverse screw rod 140, a transverse guiding rod 141 and a transverse motor assembly 142. The transverse screw rod 140 is disposed on the base 13 and arranged in the transverse direction X. The transverse guiding rod 141 is disposed on the base 13 and parallel to the transverse screw rod 140. The first display module 11 and the second display module 12 are disposed on the transverse screw rod 140 and the transverse guiding rod 141 in a movable manner along the transverse direction X. The transverse motor assembly 142 is coupled to the transverse screw rod 140 and electrically connected to the control unit 16. The control unit 16 controls the transverse motor assembly 142 to drive the transverse screw rod 140 to drive the first display module 11 and the second display module 12 to move along the transverse direction X. The transverse guiding rod 141 guides the first display module 11 and the second display module 12 to move along the transverse direction X and restrains the first display module 11 and the second display module 12 from moving along the longitudinal direction Y when the first display module 11 and the second display module 12 move along the transverse direction X. However, components and structures of the transverse driving module 14 are not limited to those illustrated in figures of this embodiment.

Each of the two longitudinal driving modules 15 includes a longitudinal screw rod 150, two longitudinal guiding rods 151, a longitudinal motor assembly 152, and a control seat 153. The longitudinal screw rod 150 is disposed on the control seat 153 and arranged in the longitudinal direction Y. The two longitudinal guiding rods 151 are disposed on the control seat 153 and parallel to the longitudinal screw rod 150. The longitudinal screw rod 150 is located between the two longitudinal guiding rods 151. The base 13 is disposed on the longitudinal screw rod 150 and the two longitudinal guiding rods 151 in a movable manner along the longitudinal direction Y. The longitudinal motor assembly 152 is disposed on the control seat 153, coupled to the longitudinal screw rod 150, and electrically connected to the control unit 16. When the control unit 16 controls the longitudinal motor assembly 152 to drive the longitudinal screw rod 150 to drive the base 13 to move along the longitudinal direction Y, the first display module 11 and the second display module 12 move along the longitudinal direction Y with the base 13. The two longitudinal guiding rods 151 guide the base 13 to move along the longitudinal direction Y and restrain the base 13 from moving along the transverse direction X when the base 13 moves along the longitudinal direction Y. However, components and structures of the longitudinal driving module 15 are not limited to those illustrated in figures of this embodiment.

Figure 4:
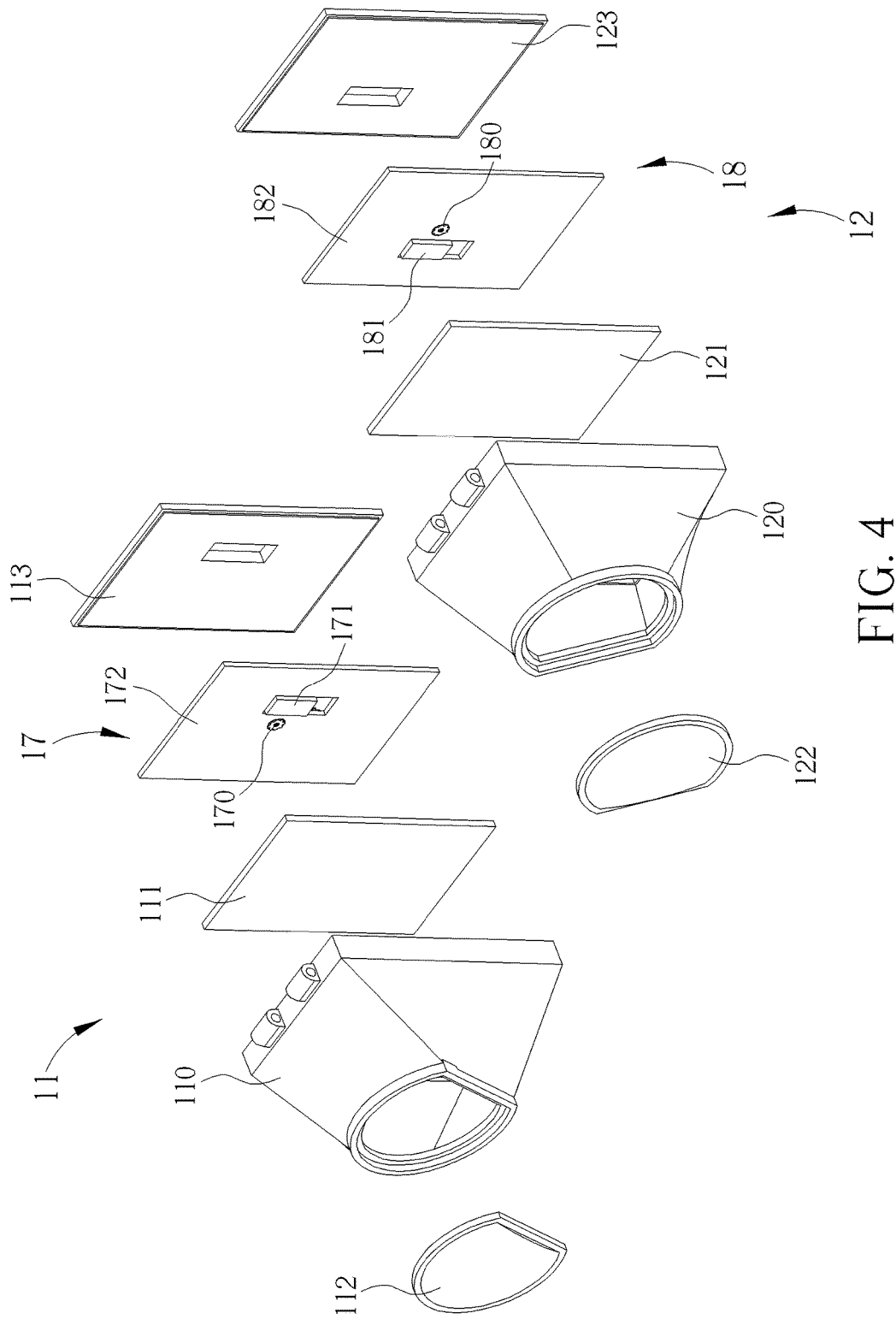
FIG. 4 is an exploded diagram of a first display module and a second display module according to the first embodiment of the present invention.

Please refer to FIG. 3 and FIG. 4. FIG. 4 is an exploded diagram of the first display module 11 and the second display module 12 according to the first embodiment of the present invention. The first display module 11 includes a first shell 110, a first display component 111, a first lens assembly 112, and a first back cover 113. The first shell 110 is movably disposed on the base 13. The first display component 111 is disposed inside the first shell 110 and for displaying the first image. The first lens assembly 112 is disposed on the first shell 110 and for enlarging the first image. The first back cover 113 is combined with the first shell 110 for covering internal components, such as the first display component 111. The second display module 12 includes a second shell 120, a second display component 121, a second lens assembly 122, and a second back cover 123. The second shell 120 is movably disposed on the base 13. The second display component 121 is disposed inside the second shell 120 and for displaying the second image. The second lens assembly 122 is disposed on the second shell 120 and for enlarging the second image. The second back cover 123 is combined with the second shell 120 for covering internal components, such as the second display component 121.

Furthermore, the adjustable virtual reality device 1 further includes a first detecting assembly 17 and a second detecting assembly 18. As shown in FIG. 4, the first detecting assembly 17 is disposed inside the first shell 110 of the first display module 11 and located at an opposite side of the first display component 111 away from the first lens assembly 112. The second detecting assembly 18 is disposed inside the second shell 120 of the second display module 12 and located at an opposite side of the second display component 121 away from the second lens assembly 122. In other words, the first detecting assembly 17 and the first lens assembly 112 are located at two opposite sides of the first display component 111, and the second detecting assembly 18 and the second lens assembly 122 are located at two opposite sides of the second display component 121.

The first detecting assembly 17 includes a first image capturing unit 170, a first distance detecting unit 171, and a first partition plate 172. The first image capturing unit 170 is electrically connected to the control unit 16 and for detecting a first position of a first pupil of a first eyeball. The first distance detecting unit 171 is for detecting a first distance between the first display module 11 and the first eyeball or a first lens of glasses, if a user wears the glasses, corresponding to the first eyeball. The first partition plate 172 is for receiving the first distance detecting unit 171 and the first image capturing unit 170. The second detecting assembly 18 includes a second image capturing unit 180, a second distance detecting unit 181, and a second partition plate 182. The second image capturing unit 180 is electrically connected to the control unit 16 and for detecting a second position of a second pupil of a second eyeball. The second distance detecting unit 181 is for detecting a second distance between the second display module 12 and the second eyeball or a second lens of the glasses corresponding to the second eyeball. The second partition plate 182 is for receiving the second distance detecting unit 181 and the second image capturing unit 180. The control unit 16 controls the transverse driving module 14 to drive the first display module 11 and the second display module 12 to move along the transverse direction X according to detecting results of the first image capturing unit 170 and the second image capturing unit 180. The control unit 16 further controls the two longitudinal driving modules 15 to drive the first display module 11 and the second display module 12 to move along the longitudinal direction Y according to detecting results of the first distance detecting unit 171 and the second distance detecting unit 181.

However, components and structures of the first detecting assembly 17 and the second detecting assembly 18 are not limited to this embodiment. In another embodiment, the first detecting assembly 17 also can only include either the first image capturing unit 170 or the first distance detecting unit 171, and the second detecting assembly 18 also can only include either the second image capturing unit 180 or the second distance detecting unit 181. Furthermore, the first distance detecting unit 171 and the second distance detecting unit 181 of the present invention are not limited to be used for detecting the first distance and the second distance. In another embodiment, the first distance detecting unit 171 also can be used for detecting a first diopter of the first eyeball, and the second distance detecting unit 181 also can be used for detecting a second diopter of the second eyeball. The control unit 16 can control the two longitudinal driving modules 15 to drive the first display module 11 and the second display module 12 to move along the longitudinal direction Y according to the first diopter and the second diopter, so that the first image and the second image are clearly focused on a first retina of the first eyeball and a second retina of the second eyeball, respectively. In other words, for a farsighted or shortsighted user, the present invention can adjust image positions of the first image and the second image focused on the retinas according to diopters detected by the distance detecting units, which allows the farsighted or shortsighted user to clearly see an image combined by the first image and the second image without wearing glasses.

Besides, as shown in FIG. 4, in this embodiment, since the first detecting assembly 17 is located at the opposite side of the first display component 111 away from the first lens assembly 112 and the second detecting assembly 18 is located at the opposite side of the second display component 121 away from the second lens assembly 122, the first display component 111 and the second display component 121 preferably can be two transparent organic light emitting diode displays or two transparent liquid crystal displays, so that the first image capturing unit 170 and the first distance detecting unit 171 of the first detecting assembly 17 and the second image capturing unit 180 and the second distance detecting unit 181 of the second detecting assembly 18 can detect the first eyeball and the second eyeball rather than being blocked by the first display component 111 and the second display component 121. However, in another embodiment, the first display component 111 and the second display component 121 also can be two non-transparent liquid crystal displays. The first detecting assembly 17 and the second detecting assembly 18 can detect the first eyeball and the second eyeball by electron beams penetrating through the two non-transparent liquid crystal displays. It depends on practical demands.

Moreover, the configurations of the first detecting assembly 17 and the second detecting assembly 18 are not limited to this embodiment. In another embodiment, the first detecting assembly 17 also can be disposed inside the first shell 110 of the first display module 11 and located at a side of the first display component 111 near the first lens assembly 112. The second detecting assembly 18 also can be disposed inside the second shell 120 of the second display module 12 and located at a side of the second display component 121 near the second lens assembly 122. In other words, the first detecting assembly 17 and the first lens assembly 112 are located at the same side of the first display component 111, and the second detecting assembly 18 and the second lens assembly 122 are located at the same side of the second display component 121. The first image capturing unit 170 and the first distance detecting unit 171 of the first detecting assembly 17 and the second image capturing unit 180 and the second distance detecting unit 181 detect the first eyeball and the second eyeball by emitting light and receiving light reflected from the first display component 111 and the second display component 121, respectively. Furthermore, in another embodiment, the first detecting assembly 17 also can be disposed on the first display component 111 and located at a position near an edge of the first display component 111, and the second detecting assembly 18 also can be disposed on the second display component 121 and located at a position near an edge of the second display component 121. Parts of the first image and the second image, which are shaded by the first detecting assembly 17 and the second detecting assembly 18, can be repaired by specific software process. It depends on practical demands.

Figure 5:
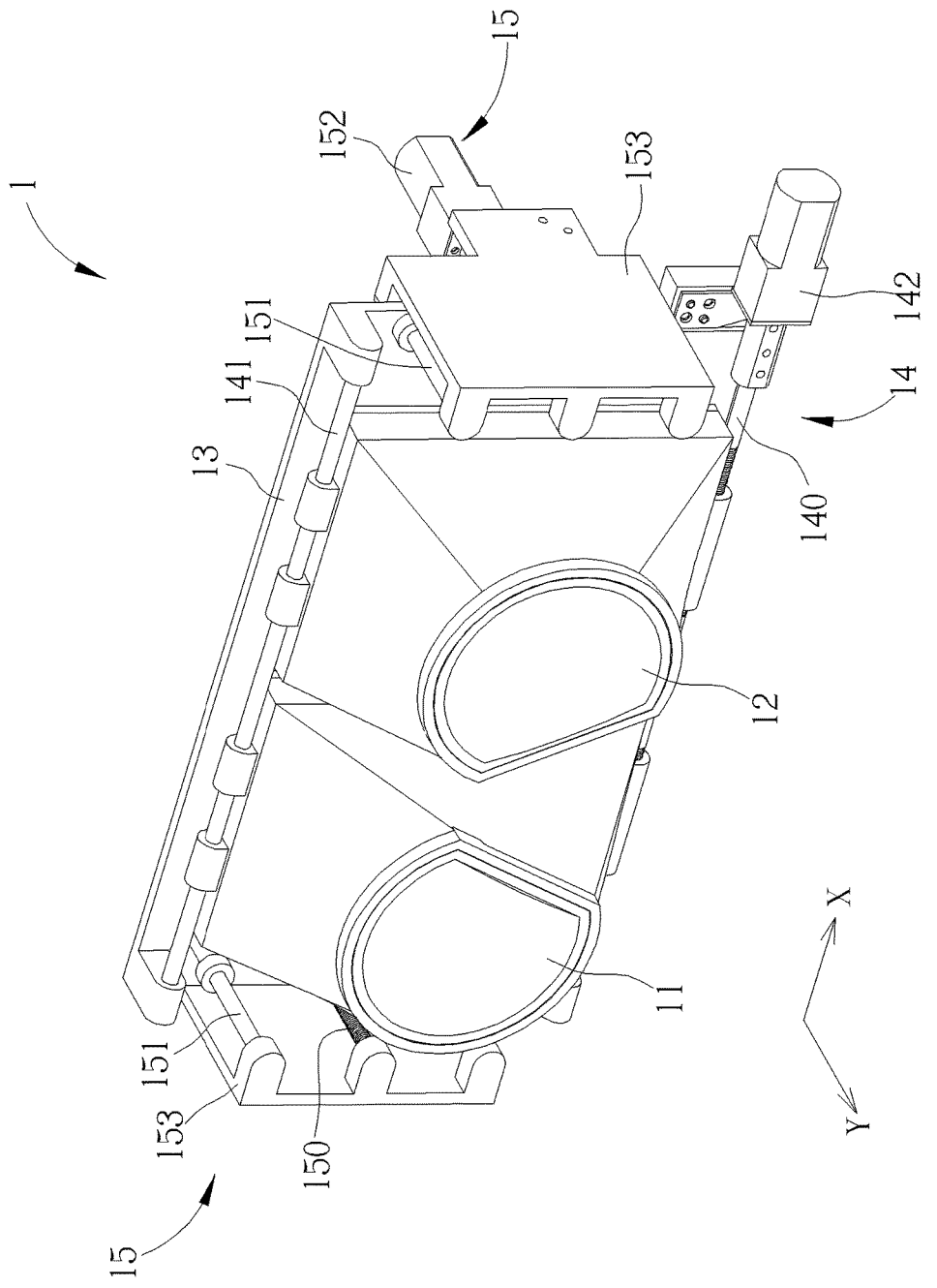
FIG. 5 to FIG. 7 are diagrams of internal components of the adjustable virtual reality device at different statuses according to the first embodiment of the present invention.
Figure 6:
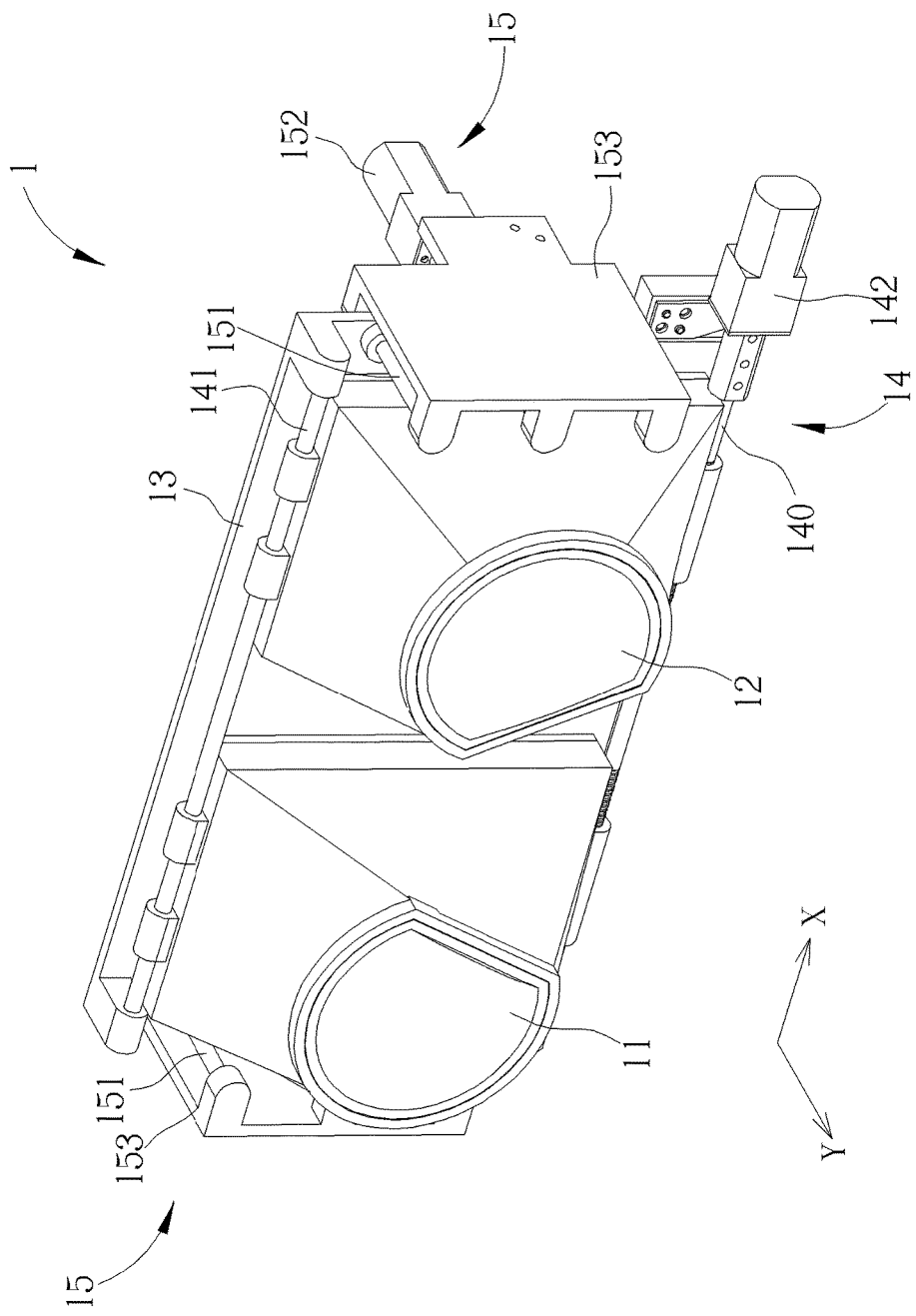
Figure 7:
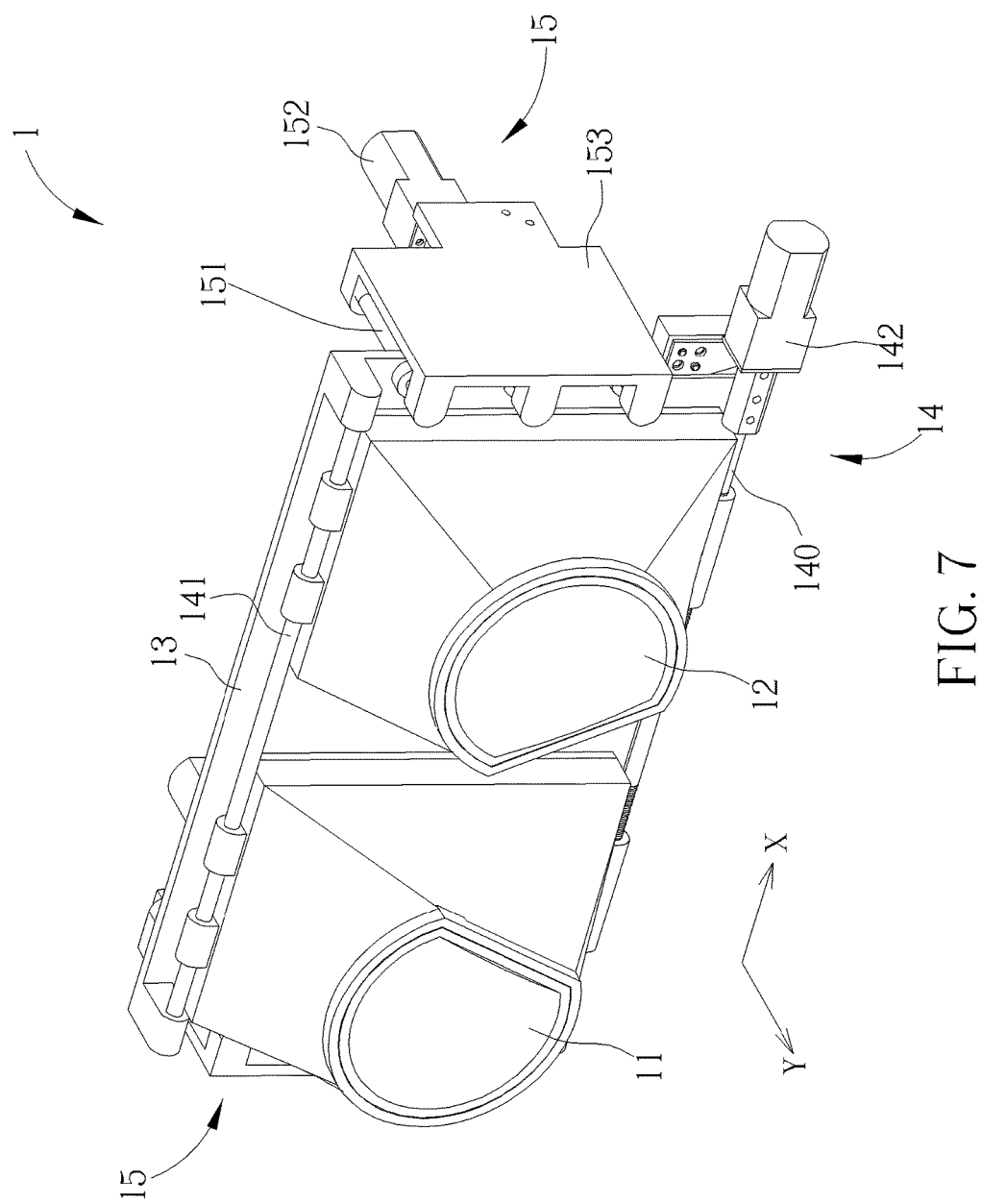

Please refer to FIG. 3 and FIG. 5 to FIG. 7. FIG. 5 to FIG. 7 are diagrams of internal components of the adjustable virtual reality device 1 at different statuses according to the first embodiment of the present invention. In order to illustrate operation of the adjustable virtual reality device 1 of the present invention specifically, the housing 10 is not shown in FIG. 5 to FIG. 7. When a user wears the adjustable virtual reality device 1, the first image capturing unit 170 and the second image capturing unit 180 detect the first position of the first pupil of the first eyeball and the second position of the second pupil of the second eyeball, respectively. The control unit 16 generates a pupil distance between the first pupil and the second pupil according to the first position and the second position and controls the transverse driving module 14 to drive the first display module 11 and the second display module 12 to move along the transverse direction X according to the pupil distance. For example, the first display module 11 and the second display module 12 move from two positions shown in FIG. 5 to another two positions shown in FIG. 6, i.e., the first display module 11 and the second display module 12 move away from each other, so that a transverse distance between the first display module 11 and the second display module 12 is corresponding to the pupil distance, which can prevent dizziness or discomfort of the user.

Furthermore, in another embodiment, when the adjustable virtual reality device 1 includes two individual transverse driving modules 14, the first display module 11 and the second display module 12 can be adjusted by the two transverse driving modules 14 to positions corresponding to positions of the first pupil and the second pupil detected by the first image capturing unit 170 and the second image capturing unit 180, respectively.

Afterwards, the first distance detecting unit 171 detects the first distance between the first display module 11 and the first eyeball or the first lens corresponding to the first eyeball, and the second distance detecting unit 181 detects the second distance between the second display module 12 and the second eyeball or the second lens corresponding to the second eyeball. That is, when the user does not wear glasses, the first distance detecting unit 171 and the second distance detecting unit 181 detects distances between two display modules and two eyeballs, respectively. On the other hand, when the user wears glasses, the first distance detecting unit 171 and the second distance detecting unit 181 detect distances between the two display modules and two lenses of the glasses. The control unit 16 controls the two longitudinal driving modules 15 to drive the first display module 11 and the second display module 12 to move along the longitudinal direction Y according to a reference distance generated by the first distance and the second distance, which allows the first display component 111 and the second display component 121 to move to adequate focus positions located behind minimum focus distances of the two eyeballs and prevents the first lens assembly 112 and the second lens assembly 122 from moving to positions located within minimum focus distances or even touching the two eyeballs or the two lenses of the glasses. The adjusted positions of the first display module 11 and the second display module 12 can be aligned or misaligned. It depends on characteristic of the user's eyeballs. For example, the adjustable virtual reality device 1 can be switched from a status shown in FIG. 6 to another status shown in FIG. 7, so that the first display module 11 and the second display module 12 are prevented from interfering with the two eyeballs or the two lenses of the glasses when the first display module 11 and the second display module 12 move close to the user, which ensures an image enlarging effect and wearing comfort at the same time.

Furthermore, the present invention further can store the aforementioned utilization parameters, such as the pupil distance, the first distance, and the second distance, into a memory unit. The control unit 16 can adjust the first display module 11 and the second display module 12 to proper positions according to the stored utilization parameters for next use. Alternatively, the control unit 16 also can compare the pupil distance, the first distance, and the second distance with the stored utilization parameters, so as to drive the transverse driving module 14 and the longitudinal driving module 15 to move the first display module 11 and the second display module 12 correspondingly.

Figure 8:
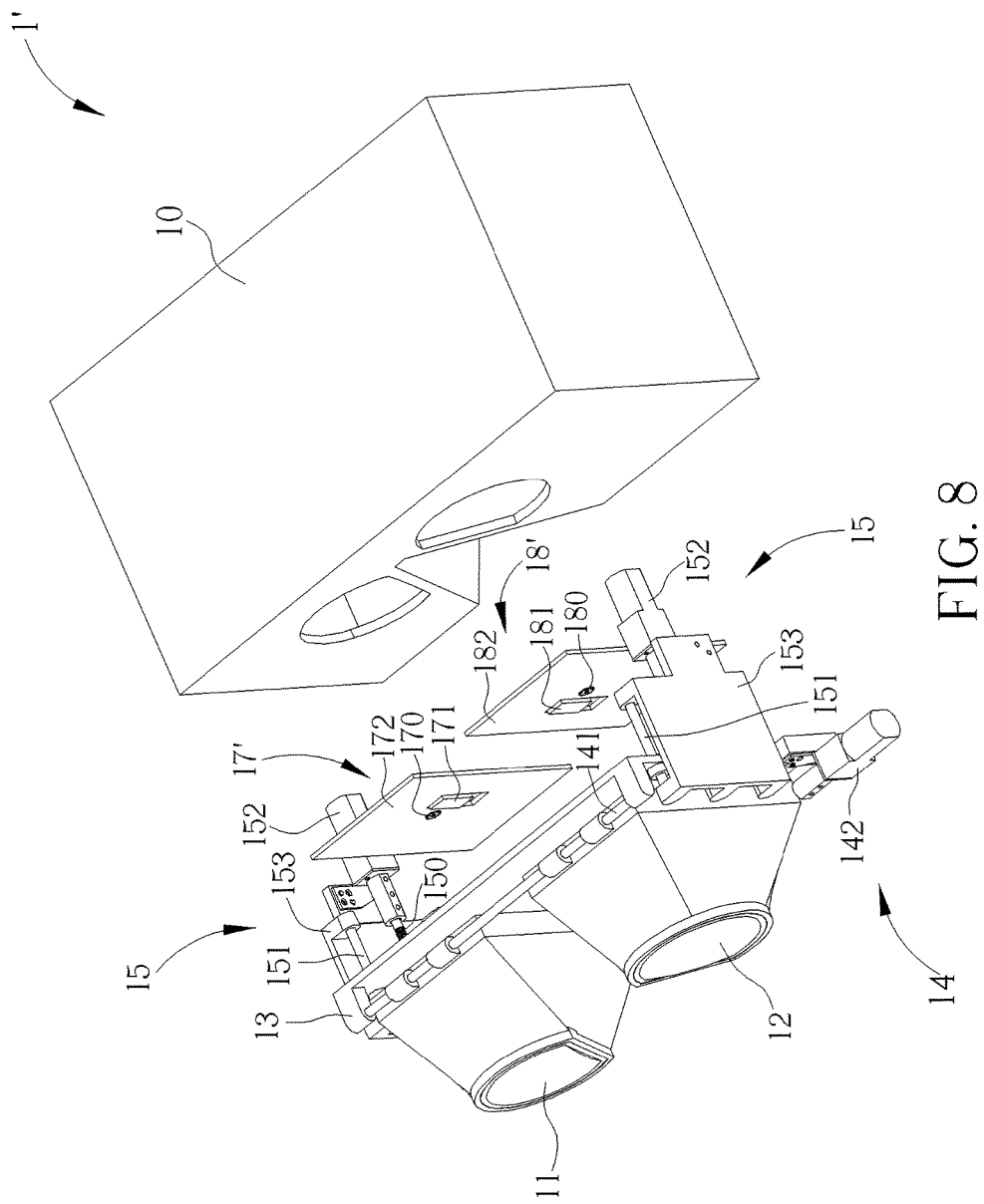
FIG. 8 is an exploded diagram of an adjustable virtual reality device according to a second embodiment of the present invention.

Please refer to FIG. 8. FIG. 8 is an exploded diagram of an adjustable virtual reality device 1' according to a second embodiment of the present invention. As shown in FIG. 8, the difference between the adjustable virtual reality device 1 of the first embodiment and the adjustable virtual reality device 1' of the second embodiment is described as follows. The first detecting assembly 17' and the first display module 11 are disposed separately. The first detecting assembly 17' is located at an outer side of the base 13 away from the first display module 11. The second detecting assembly 18' and the second display module 12 are disposed separately. The second detecting assembly 18' is located at an outer side of the base 13 away from the second display module 12. The base 13 is made of transparent materials for allowing the first image capturing unit 170 and the first distance detecting unit 171 of the first detecting assembly 17' and the second image capturing unit 180 and the second distance detecting unit 181 of the second detecting assembly 18' to detect the first eyeball and the second eyeball rather than being blocked by the base 13. Components with denoted numerals in this embodiment identical to those in the aforesaid embodiment have identical structures and functions, and further description is omitted herein for simplicity.

In contrast to the prior art, the adjustable virtual reality device of the present invention utilizes the first image capturing unit and the second image capturing unit for detecting the two positions of the first pupil of the first eyeball and the second pupil of the second eyeball, and controls the transverse driving module to drive the first display module and the second display module to move along the transverse direction according to the pupil distance between the first pupil and the second pupil or the two positions of the first pupil and the second pupil, which allows the transverse distance between the first display module and the second display module to be corresponding to the pupil distance or allows the two positions of the first display module and the second display module to be corresponding to the two positions of the first pupil and the second pupil. Therefore, it enhances comfort in use. Besides, the adjustable virtual reality device of the present invention further utilizes the first distance detecting unit and the second distance detecting unit for detecting the first distance between the first display module and the first eyeball or the first lens of the glasses corresponding to the first eyeball and the second distance between the second display module and the second eyeball or the second lens of the glasses corresponding to the second eyeball, and controls the longitudinal driving module to drive the first display module and the second display module to move along the longitudinal direction according to the first distance and the second distance, which prevents the first display module and the second display module from interfering with the first eyeball and the second eyeball or the first lens and the second lens of the glasses. It also enhances comfort in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustable virtual reality device capable of adjusting display modules, the adjustable virtual reality device comprising:
    a housing;
    a base disposed inside the housing;
    a first display module movably disposed on the base to display a first image;
    a first detecting assembly comprising a first image capturing unit to detect a first position of a first pupil of a first eyeball;
    a second display module movably disposed on the base to display a second image;
    a second detecting assembly comprising a second image capturing unit to detect a second position of a second pupil of a second eyeball;
    at least one transverse driving module to drive the first display module and the second display module to move individually or synchronously along a transverse direction, the at least one transverse driving module comprising:
        a transverse screw rod disposed on the base and arranged in the transverse direction;
        a transverse guiding rod disposed on the base and parallel to the transverse screw rod, the first display module and the second display module being disposed on the transverse screw rod and the transverse guiding rod in a movable manner along the transverse direction; and
        a transverse motor assembly coupled to the transverse screw rod; and
    a control unit electrically connected to the transverse motor assembly of the at least one transverse driving module, the first image capturing unit, and the second image capturing unit, the control unit controlling the transverse motor assembly of the at least one transverse driving module to drive the transverse screw rod to drive the first display module and the second display module to move individually or synchronously along the transverse direction according to a relation between the first pupil and the second pupil based on the first position of the first pupil detected by the first image capturing unit and the second position of the second pupil detected by the second image capturing unit.

2. The adjustable virtual reality device of claim 1, wherein the relation refers to a pupil distance between the first pupil and the second pupil, the control unit controls the at least one transverse driving module to drive the first display module and the second display module to move individually or synchronously along the transverse direction, so that a transverse distance between the first display module and the second display module is corresponding to the pupil distance.

3. The adjustable virtual reality device of claim 1, wherein the relation refers to the first position of the first pupil and the second position of the second pupil, the control unit controls the at least one transverse driving module to drive the first display module and the second display module to move individually or synchronously along the transverse direction, so that the first display module and the second display module are located at positions corresponding to the first position and the second position, respectively.

4. The adjustable virtual reality device of claim 1, wherein the first detecting assembly further comprises a first partition plate to receive the first image capturing unit, and the second detecting assembly further comprises a second partition plate to receive the second image capturing unit.

5. An adjustable virtual reality device capable of adjusting display modules, the adjustable virtual reality device comprising:
    a housing;
    a base disposed inside the housing;
    a first display module movably disposed on the base to display a first image;
    a first detecting assembly comprising a first distance detecting unit to detect a first distance between the first display module and a first eyeball or a first lens of glasses corresponding to a first eyeball;
    a second display module movably disposed on the base to display a second image;
    a second detecting assembly comprising a second distance detecting unit to detect a second distance between a second display module and a second eyeball or a second lens of the glasses corresponding to a second eyeball;
    a longitudinal driving module to drive the first display module and the second display module to move along a longitudinal direction, the longitudinal driving module comprising:
        a control seat;
        a longitudinal screw rod disposed on the control seat and arranged in the longitudinal direction;
        a longitudinal guiding rod disposed on the control seat and parallel to the longitudinal screw rod, the base being disposed on the longitudinal screw rod and the longitudinal guiding rod in a movable manner along the longitudinal direction; and
        a longitudinal motor assembly disposed on the control seat and coupled to the longitudinal screw rod; and
    a control unit electrically connected to the longitudinal motor assembly of the longitudinal driving module, the first distance detecting unit, and the second distance detecting unit, the control unit controlling the longitudinal motor assembly of the longitudinal driving module to drive the longitudinal screw rod to drive the base to move along the longitudinal direction, so as to drive the first display module and the second display module to move along the longitudinal direction according to a reference distance generated by the first distance and the second distance.

6. The adjustable virtual reality device of claim 5, wherein the first detecting assembly further comprises a first partition plate to receive the first distance detecting unit, and the second detecting assembly further comprises a second partition plate to receive the second distance detecting unit.

7. An adjustable virtual reality device capable of adjusting display modules, the adjustable virtual reality device comprising:
    a housing;
    a base disposed inside the housing;

a first display module movably disposed on the base to display a first image;
a first detecting assembly comprising:
  a first image capturing unit to detect a first position of a first pupil of a first eyeball; and
  a first distance detecting unit to detect a first distance between the first display module and the first eyeball or a first lens of glasses corresponding to the first eyeball;
a second display module movably disposed on the base to display a second image;
a second detecting assembly comprising:
  a second image capturing unit to detect a second position of a second pupil of a second eyeball; and
  a second distance detecting unit to detect a second distance between the second display module and the second eyeball or a second lens of the glasses corresponding to the second eyeball;
at least one transverse driving module to drive the first display module and the second display module to move individually or synchronously along a transverse direction;
a longitudinal driving module to drive the first display module and the second display module to move individually or synchronously along a longitudinal direction substantially perpendicular to the transverse direction; and
a control unit electrically connected to the at least one transverse driving module, the longitudinal driving module, the first image capturing unit, the first distance detecting unit, the second image capturing unit, and the second distance detecting unit, the control unit controlling the at least one transverse driving module to drive the first display module and the second display module to move individually or synchronously along the transverse direction according to a relation between the first pupil and the second pupil based on the first position of the first pupil detected by the first image capturing unit and the second position of the second pupil detected by the second image capturing unit, and the control unit further controlling the longitudinal driving module to drive the first display module and the second display module to move individually or synchronously along the longitudinal direction substantially perpendicular to the transverse direction according to a reference distance generated by the first distance and the second distance.

8. The adjustable virtual reality device of claim 7, wherein the longitudinal driving module comprises:
a control seat;
a longitudinal screw rod disposed on the control seat and arranged in the longitudinal direction;
a longitudinal guiding rod disposed on the control seat and parallel to the longitudinal screw rod, the base being disposed on the longitudinal screw rod and the longitudinal guiding rod in a movable manner along the longitudinal direction; and
a longitudinal motor assembly disposed on the control seat and coupled to the longitudinal screw rod and electrically connected to the control unit, the control unit controlling the longitudinal motor assembly to drive the longitudinal screw rod to drive the base to move along the longitudinal direction, so as to move the first display module and the second display module along the longitudinal direction.

9. The adjustable virtual reality device of claim 7, wherein the first distance detecting unit is further to detect a first diopter of the first eyeball, the second distance detecting unit is further to detect a second diopter of the second eyeball, and the control unit controls the longitudinal motor assembly to drive the longitudinal screw rod to drive the first display module and the second display module to move along the longitudinal direction according to the first diopter and the second diopter, so that the first image and the second image are focused on a first retina of the first eyeball and a second retina of the second eyeball, respectively.

10. The adjustable virtual reality device of claim 7, wherein the first detecting assembly further comprises a first partition plate to receive the first distance detecting unit and the first image capturing unit, and the second detecting assembly further comprises a second partition plate to receive the second distance detecting unit and the second image capturing unit.

11. An adjustable virtual reality device capable of adjusting display modules, the adjustable virtual reality device comprising:
a housing;
a base disposed inside the housing;
a first display module movably disposed on the base to display a first image the first display module comprising:
  a first shell movably disposed on the base;
  a first display component disposed inside the first shell to display the first image; and
  a first lens assembly disposed on the first shell to enlarge the first image;
a first detecting assembly comprising a first image capturing unit to detect a first position of a first pupil of a first eyeball;
a second display module movably disposed on the base to display a second image, the second display module comprising:
  a second shell movably disposed on the base;
  a second display component disposed in the second shell to display the second image; and
  a second lens assembly disposed on the second shell to enlarge the second image;
a second detecting assembly comprising a second image capturing unit to detect a second position of a second pupil of a second eyeball;
at least one transverse driving module to drive the first display module and the second display module to move individually or synchronously along a transverse direction; and
a control unit electrically connected to the at least one transverse driving module, the first image capturing unit, and the second image capturing unit, the control unit controlling the at least one transverse driving module to drive the first display module and the second display module to move individually or synchronously along the transverse direction according to a relation between the first pupil and the second pupil based on the first position of the first pupil detected by the first image capturing unit and the second position of the second pupil detected by the second image capturing unit.

12. The adjustable virtual reality device of claim 11, wherein the first display component and the second display component are transparent organic light emitting diode displays or transparent liquid crystal displays.

13. The adjustable virtual reality device of claim 12, wherein the first detecting assembly is disposed inside the first shell of the first display module and located at an opposite side of the first display component away from the first lens assembly, and the second detecting assembly is disposed inside the second shell of the second display module and located at an opposite side of the second display component away from the second lens assembly.

14. The adjustable virtual reality device of claim 12, wherein the base is made of transparent material, the first detecting assembly and the first display module are disposed separately, the first detecting assembly is located at an outer side of the base away from the first display module, the second detecting assembly and the second display module are disposed separately, and the second detecting assembly is located at an outer side of the base away from the second display module.

15. The adjustable virtual reality device of claim 11, wherein the first detecting assembly is disposed inside the first shell of the first display module and located at a side of the first display component near the first lens assembly, the second detecting assembly is disposed in the second shell of the second display module and located at a side of the second display component near the second lens assembly, and the first image capturing unit and the second image capturing unit detect the first position of the first pupil and the second position of the second pupil in a reflecting manner by the first display component and the second display component.

16. An adjustable virtual reality device capable of adjusting display modules, the adjustable virtual reality device comprising:
a housing;
a base disposed inside the housing;
a first display module movably disposed on the base to display a first image;
a first detecting assembly comprising a first distance detecting unit to detect a first distance between the first display module and a first eyeball or a first lens of glasses corresponding to a first eyeball and further to detect a first diopter of the first eyeball;
a second display module movably disposed on the base to display a second image;
a second detecting assembly comprising a second distance detecting unit to detect a second distance between a second display module and a second eyeball or a second lens of the glasses corresponding to a second eyeball and further to detect a second diopter of the second eyeball;
a longitudinal driving module to drive the first display module and the second display module to move along a longitudinal direction; and
a control unit electrically connected to the longitudinal driving module, the first distance detecting unit, and the second distance detecting unit, the control unit controlling the longitudinal driving module to drive the first display module and the second display module to move along the longitudinal direction according to the first diopter and the second diopter, so that the first image and the second image are focused on a first retina of the first eyeball and a second retina of the second eyeball, respectively.

17. An adjustable virtual reality device capable of adjusting display modules, the adjustable virtual reality device comprising:
a housing;
a base disposed inside the housing;
a first display module movably disposed on the base to display a first image;
a first detecting assembly comprising:
a first distance detecting unit to detect a first distance between the first display module and a first eyeball or a first lens of glasses corresponding to a first eyeball; and
a first image capturing unit to detect a first position of a first pupil of the first eyeball;
a second display module movably disposed on the base to display a second image;
a second detecting assembly comprising:
a second distance detecting unit to detect a second distance between a second display module and a second eyeball or a second lens of the glasses corresponding to a second eyeball; and
a second image capturing unit to detect a second position of a second pupil of the second eyeball;
a longitudinal driving module to drive the first display module and the second display module to move along a longitudinal direction;
at least one transverse driving module to drive the first display module and the second display module to move individually or synchronously along a transverse direction perpendicular to the longitudinal direction, the at least one transverse driving module comprising:
a transverse screw rod disposed on the base and arranged in the transverse direction;
a transverse guiding rod disposed on the base and parallel to the transverse screw rod, the first display module and the second display module being disposed on the transverse screw rod and the transverse guiding rod in a movable manner along the transverse direction; and
a transverse motor assembly coupled to the transverse screw rod; and
a control unit electrically connected to the transverse motor assembly of the at least one transverse driving module, the longitudinal driving module, the first image capturing unit, the first distance detecting unit, the second image capturing unit, and the second distance detecting unit, the control unit controlling the longitudinal driving module to drive the first display module and the second display module to move along the longitudinal direction according to a reference distance generated by the first distance and the second distance, and the control unit further controlling the transverse motor assembly to drive the transverse screw rod to drive the first display module and the second display module to move along the transverse direction.

18. An adjustable virtual reality device capable of adjusting display modules, the adjustable virtual reality device comprising:
a housing;
a base disposed inside the housing;
a first display module movably disposed on the base to display a first image the first display module comprising:
a first shell movably disposed on the base;
a first display component disposed inside the first shell to display the first image; and
a first lens assembly disposed on the first shell to enlarge the first image;
a first detecting assembly comprising a first distance detecting unit to detect a first distance between the first display module and a first eyeball or a first lens of glasses corresponding to a first eyeball;
a second display module movably disposed on the base to display a second image, the second display module comprising:

a second shell movably disposed on the base;
a second display component disposed in the second shell to display the second image; and
a second lens assembly disposed on the second shell to enlarge the second image;
a second detecting assembly comprising a second distance detecting unit to detect a second distance between a second display module and a second eyeball or a second lens of the glasses corresponding to a second eyeball;
a longitudinal driving module to drive the first display module and the second display module to move along a longitudinal direction; and
a control unit electrically connected to the longitudinal driving module, the first distance detecting unit, and the second distance detecting unit, the control unit controlling the longitudinal driving module to drive the first display module and the second display module to move along the longitudinal direction according to a reference distance generated by the first distance and the second distance.

19. The adjustable virtual reality device of claim 18, wherein the first display component and the second display component are two transparent organic light emitting diode displays or two transparent liquid crystal displays.

20. The adjustable virtual reality device of claim 19, wherein the first detecting assembly is disposed inside the first shell of the first display module and located at an opposite side of the first display component away from the first lens assembly, and the second detecting assembly is disposed inside the second shell of the second display module and located at an opposite side of the second display component away from the second lens assembly.

21. The adjustable virtual reality device of claim 19, wherein the base is made of transparent material, the first detecting assembly and the first display module are disposed separately, the first detecting assembly is located at an outer side of the base away from the first display module, the second detecting assembly and the second display module are disposed separately, and the second detecting assembly is located at an outer side of the base away from the second display module.

22. The adjustable virtual reality device of claim 18, wherein the first detecting assembly is disposed inside the first shell of the first display module and located at a side of the first display component near the first lens assembly, the second detecting assembly is disposed in the second shell of the second display module and located at a side of the second display component near the second lens assembly, and the first image capturing unit and the second image capturing unit detect the first distance and the second distance in a reflecting manner by the first display component and the second display component.

* * * * *